(12) United States Patent
Urai et al.

(10) Patent No.: US 6,256,177 B1
(45) Date of Patent: Jul. 3, 2001

(54) GIANT MAGNETORESISTIVE SENSING ELEMENT HAVING LONGITUDINALLY BIASED FREE LAYER WITH EASY AXIS THEREOF PARALLEL WITH SIGNAL FIELD

(75) Inventors: Haruo Urai; Shigeru Mori, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/281,109

(22) Filed: Mar. 29, 1999

(30) Foreign Application Priority Data

Mar. 31, 1998 (JP) .................................................. 10-087111

(51) Int. Cl.$^7$ ........................................................ G11B 5/39
(52) U.S. Cl. .............................................................. 360/324.12
(58) Field of Search ........................................ 360/324.12

(56) References Cited

U.S. PATENT DOCUMENTS

| | | | |
|---|---|---|---|
| 5,546,253 | * | 8/1996 | Che . |
| 5,549,978 | * | 8/1996 | Iwasaki et al. . |
| 5,666,248 | * | 9/1997 | Gill . |
| 5,677,625 | * | 10/1997 | Dieny . |
| 5,909,345 | * | 6/1999 | Kawawake et al. . |
| 5,933,297 | * | 8/1999 | Hoshiya et al. . |
| 6,064,552 | * | 5/2000 | Iwasaki et al. . |
| 6,088,195 | * | 7/2000 | Kamiguchi et al. . |

FOREIGN PATENT DOCUMENTS

| | | |
|---|---|---|
| 8-83410 | 3/1996 | (JP) . |
| 9-266334 | 10/1997 | (JP) . |

* cited by examiner

Primary Examiner—Craig A. Renner
(74) Attorney, Agent, or Firm—Hayes, Soloway, Hennessey, Grossman & Hage, PC

(57) ABSTRACT

Since the magnetic field response sensitivity of a resistance change δR is deteriorated to a low value when a longitudinal bias magnetic field is applied, a structure by which a higher magnetic field response sensitivity is obtained is realized. A giant magnetoresistive sensing element for detecting a magnetic field from a magnetic disk to read a signal includes a magnetic fixed layer magnetized in parallel to a signal magnetic field direction, an electrically conductive layer to which a current is supplied from the exterior, for detecting a resistance change which is used for reading a signal, and a magnetic free layer which vibratingly rotates a direction of magnetization thereof due to the signal magnetic field from the magnetic disk, wherein the magnetic easy axis of the magnetic free layer is in parallel to the signal magnetic field direction, and the MR sensitivity in the signal magnetic field direction is higher than the MR sensitivity to a direction perpendicular to the signal magnetic field.

14 Claims, 11 Drawing Sheets

GIANT MAGNETORESISTIVE SENSING ELEMENT HAVING LONGITUDINALLY BIASED FREE LAYER WITH EASY AXIS THEREOF PARALLEL WITH SIGNAL FIELD

BACKGROUND OF THE INVENTION

1. Field of the Invention

The present invention relates to a technique of a magnetic head of a magnetic recording disk device such as a magnetic disk drive and a magnetic tape drive and its magnetoresistive sensing element, and more particularly to a giant magnetoresistive sensing element (hereinafter referred to as "GMR") and a magnetic head and a magnetic disk device using the GMR.

2. Description of the Related Art

As a magnetic recording density has been made higher, a head higher in a signal magnetic field sensitivity has been required. An initial magnetic induction thin-film head cannot be adapted to the recording density of more than 1 Gbit/inch$^2$. Instead of this type, there has been developed a magnetoresistive head using the magnetoresistance of a ferromagnetic metal thin film as a head high in read sensitivity. However, it has been found that this magnetoresistive head similarly has lacked for the read sensitivity in reading the magnetic recording in a high-recording density region of more than 3 Gb/inch$^2$, and therefore it has been expected to realize a high-sensitive magnetic head superior to the magnetoresistive head.

Under that circumstances, a magnetic head using a magnetic element with a spin valve structure has been proposed in 1994, and several experimental studies have been made.

The outline of the structures of those magnetic heads will be described below.

In a slider-shaped magnetic head shown in FIG. 1, a head element 2 that detects a magnetic field includes a giant magnetoresistive sensing element (magnetic field sensor) 18 shown in FIG. 2, and an inductive recording element (not shown) comprised of a plurally-wound coil pattern 7 and a soft magnetic yoke (not shown) surrounding the coil pattern 7. In FIG. 1, denotation 4 means electrode terminal and denotation 5 means signal wise magnetic field represented by Hy and denotation 6 means track widthwise magnetic field. In FIG. 2, denotation 17 means fixed magnetization and denotation 19 means medium magnetization.

In the case where the magnetic head thus structured is located on a recording medium 20 shown in FIG. 2, that is, a magnetic disk, to obtain a read output, a signal magnetic field 5 perpendicular to an air bearing surface 3 (hereinafter referred to as "ABS 3") shown in FIG. 1 is detected. The principle of the detection of the signal magnetic field is shown in FIG. 2.

In general, the giant magnetoresistive sensing element 18 is of the structure in which a magnetic fixed layer 11 and a magnetic free layer 13 are opposed to each other through a conductor layer (not shown) of 2 to 3 nm in thickness as shown in FIG. 2. The signal magnetic field from the recording medium 20 makes a direction of magnetization of the magnetic free layer 13 vibratingly rotate. In this situation, assuming that an angle defined between the magnetization M of the magnetic free layer 13 and the fixed magnetization 17 of the magnetic fixed layer 11 is θ, a resistance change δR is represented by δR=−(½)ΔR·cos θ, where ΔR represents a maximum resistance change (refer to FIG. 3).

As usual, the degree of a response of the resistance change δR to the signal magnetic field represents the magnetic field response sensitivity of the giant magnetoresistive sensing element. Even in the case where it is judged whether an element is good or bad in quality as the magnetic head during an inspection process, a magnetic field in the signal direction is applied from the exterior to evaluate the δR of that element. Because the sensitivity to a magnetic field in a track widthwise direction perpendicular to the signal magnetic field is irrelevant to the operation of the element up to now, it has not been disclosed in the above prior art at all.

A conceptual diagram of those conventional giant magnetoresistive sensing element structures is shown in FIG. 9.

In those conventional examples, a magnetic easy axis 27 (uni-axial anisotropy) of the magnetic free layer 13 having the sensitivity in the signal magnetic field 5 is disposed perpendicularly to the signal magnetic field 5 so that the magnetic free layer 13 is liable to be subjected to domain stabilization with a single domain structure, and in addition, in order to ensure the domain stabilization with the single domain structure, a longitudinal bias magnetic field Ht 28 is applied to a direction (track widthwise direction 41) perpendicular to the signal magnetic field 5 by a permanent magnet film.

As a result, as shown in FIG. 10, no hysteresis occurs in a response curve of the resistance change δR of the spin valve element to the magnetic field in the signal magnetic field direction.

However, the magnetic field response sensitivity (MR sensitivity) in the above conventional example is less than 1, as shown in FIG. 11, according to the simulation result using a so-called coherent magnetization rotation model. In the present specification, MR sensitivity=1 means a case in which the resistance change δR when the signal magnetic field intensity Hy equal to Hk is applied is equal to ½ of the maximum resistance change ΔR. There has been found from the results of the inventor's study that there arises the following problem. That is, as the longitudinal bias magnetic field Ht is applied, the MR sensitivity reduces monotonously with the result that the sensitivity is deteriorated to ½ or less by the longitudinal bias magnetic field of only Ht=Hk (Hk is uni-axial anisotropy). Also, it has been proved from the inventor's study that there arises such a problem that in the case where the magnetic free layer 13 is arranged in a direction of the magnetic easy axis 27 as shown in FIG. 9, the magnetic response sensitivity of the resistance change δR in the signal magnetic field direction becomes lower than the sensitivity of the magnetic field response perpendicular to the signal magnetic field direction.

The prior art gives rise to such a problem that the sensitivity is deteriorated by the provision of means for permitting stable operation in the spin valve head which is designed so as to obtain the high sensitivity.

SUMMARY OF THE INVENTION

The present invention has been made to solve the problems with the above prior art, and therefore an object of the present invention is to provide the element structure that improves the MR sensitivity even by using the same spin valve material.

In order to achieve the above object, according to the present invention, there is provided a giant magnetoresistive sensing element for detecting a magnetic field from a magnetic disk to read a signal, comprising:

a magnetic fixed layer magnetized in parallel to a magnetic field direction of a signal from the magnetic disk (hereinafter referred to as "signal magnetic field direction");

an electrically conductive layer to which a current is supplied from the exterior, for detecting a resistance change which is used for reading a signal; and a magnetic free layer which a magnetic easy axis thereof is in parallel to the signal magnetic field direction.

Also, according to the present invention, there is provided a giant magnetoresistive sensing element for detecting a magnetic field from a magnetic disk to read a signal, comprising:

a magnetic fixed layer magnetized in parallel to a signal magnetic field direction;

an electrically conductive layer to which a current is supplied from the exterior, for detecting a resistance change which is used for reading a signal; and a magnetic free layer which vibratingly rotates a direction of magnetization thereof due to the signal magnetic field from the magnetic disk, wherein the MR sensitivity in the signal magnetic field direction is higher than the MR sensitivity to a direction perpendicular to the signal magnetic field.

Further, according to the present invention, there is provided a giant magnetoresistive sensing element in which the magnetic easy axis of the magnetic free layer is in parallel to a direction of the signal magnetic field.

Still further, according to the present invention, there is provided a giant magnetoresistive sensing element in which the intensity of a longitudinal bias magnetic field is larger than the intensity of a uni-axial anisotropy magnetic field of the magnetic free layer.

Yet still further, according to the present invention, there is provided a giant magnetoresistive sensing element in which the intensity of a longitudinal bias magnetic field is larger than the intensity of a uni-axial anisotropy magnetic field of the magnetic free layer and preferably smaller than twice of the intensity of the uni-axial anisotropy magnetic field.

Even in the spin valve element, the magnetic field response sensitivity cannot be infinitely made high only by the selection of a material. According to the present invention, there is provided an element structure which is capable of obtaining higher magnetic field response sensitivity even if the same spin valve material is used.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, and read in conjunction with the accompanying drawings, wherein:

DESCRIPTION OF THE PREFERRED EMBODIMENTS

Now, a description will be given in more detail of an embodiment of the present invention with reference to the accompanying drawings.

An embodiment of the present invention will be described with reference to FIGS. 4 and 5.

Figure 4:
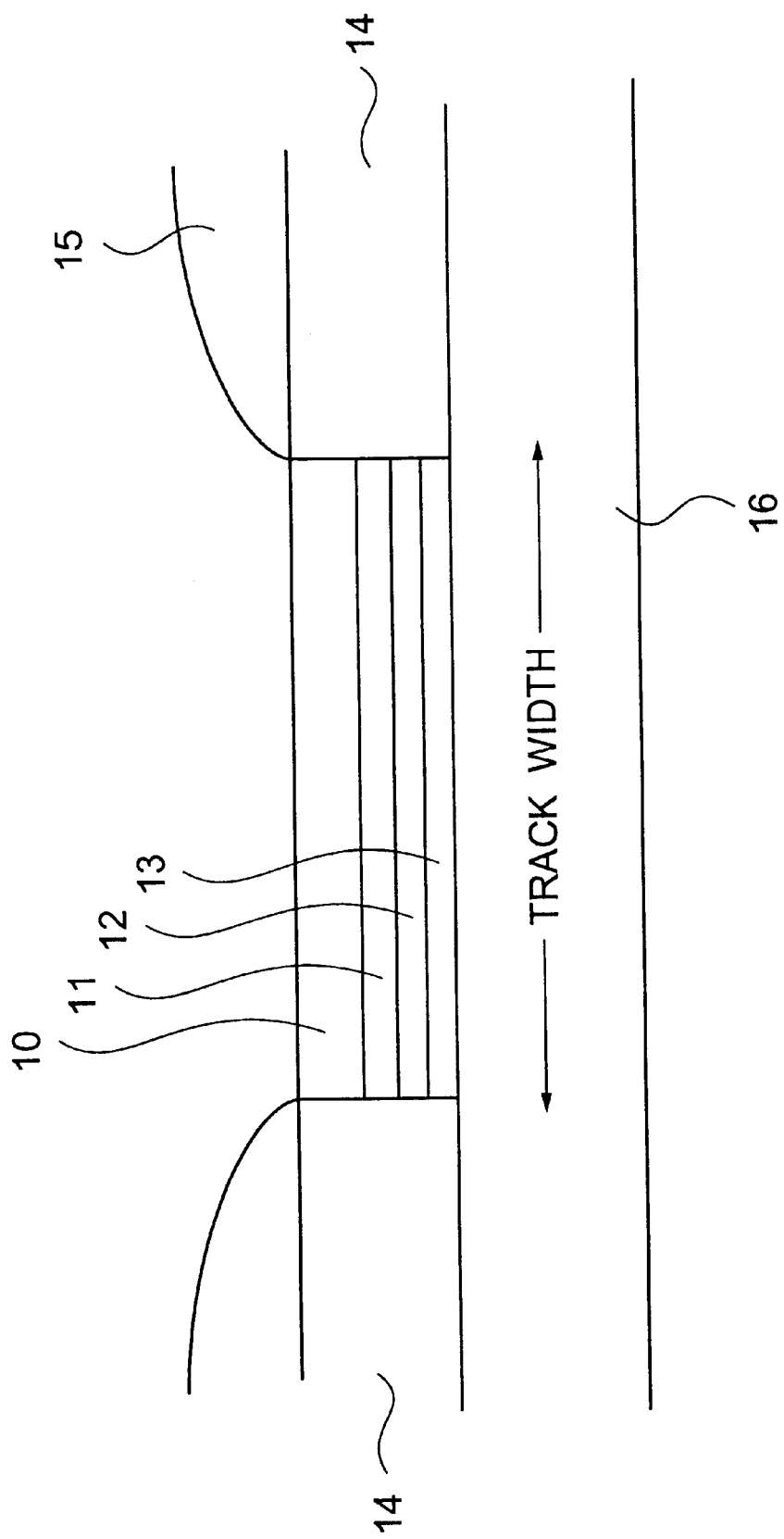
FIG. 4 is a cross-sectional diagram showing the structure of a giant magnetoresistive sensing element in accordance with the present invention.

A giant magnetoresistive sensing element according to the present invention is formed, as shown in FIG. 4 (a diagram viewed from an ABS 3 of a slider 1), by sequentially sputtering, on a non-magnetic substrate 16, a Ta under film (3 nm in thickness but not shown), NiFe (6 nm in thickness) and CoFe (2 nm in thickness) as a magnetic free layer 13 which a direction of magnetization thereof vibratingly rotates due to a signal magnetic field from a magnetic disk, Cu (2.5 nm in thickness) as an electrically conductive layer 12 to which a current is supplied from the exterior in order to detect a resistance change which is used for reading a signal, CoFe (4 nm in thickness) as a magnetic fixed layer 11, NiMn layer (20 nm in thickness) as an anti-ferromagnetic exchange coupling layer 10 for fixing the magnetization, and Ta (3 nm in thickness but not shown) as a cover layer, and then conducting exposure and etching so as to provide a given track width. Thereafter, CoCrPt (40 nm in thickness) as a longitudinal bias layer 14 for domain stabilization with a single domain structure of the magnetic free layer 13 is patterned on both sides of the giant magnetoresistive sensing element thus formed. Denotation 15 means electrode.

As shown in FIG. 4, after the film formation and patterning have been implemented, in order to stabilize the NiMn anti-ferromagnetic exchange coupling layer 10 and determine the direction of magnetization of the magnetic fixed layer 11, annealing is conducted in a magnetic field of 1000 oersted at 260° C. for 5 hours. As a result, as shown in FIG. 5, the magnetization of the magnetic fixed layer 11 is directed to any one of the upward or downward of the direction of the signal magnetic field due to the anti-ferromagnetic exchange coupling. The magnetic easy axis 29 of the magnetic free layer 13 (the intensity of the uni-axial anisotropy magnetic field is Hk) is formed in parallel to the direction of magnetization of the magnetic fixed layer 11. In FIG. 5, denotation 26 means magnetization rotation.

Subsequently, the temperature of the element is returned to a room temperature, and a magnetic field of 3000 Oe is applied to the element perpendicularly to the direction of magnetization of the magnetic fixed layer 11 (corresponding to a track widthwise direction in the magnetic recording), to thereby magnetize the longitudinal bias layer 14 (magnet film). The intensity of Ht occurs from the longitudinal bias layer 14. In this example, the above relation of the film thickness satisfies Ht>Hk.

The operation of the giant magnetoresistive sensing element according to the present invention will be described with reference to the above-described embodiment.

Figure 6:
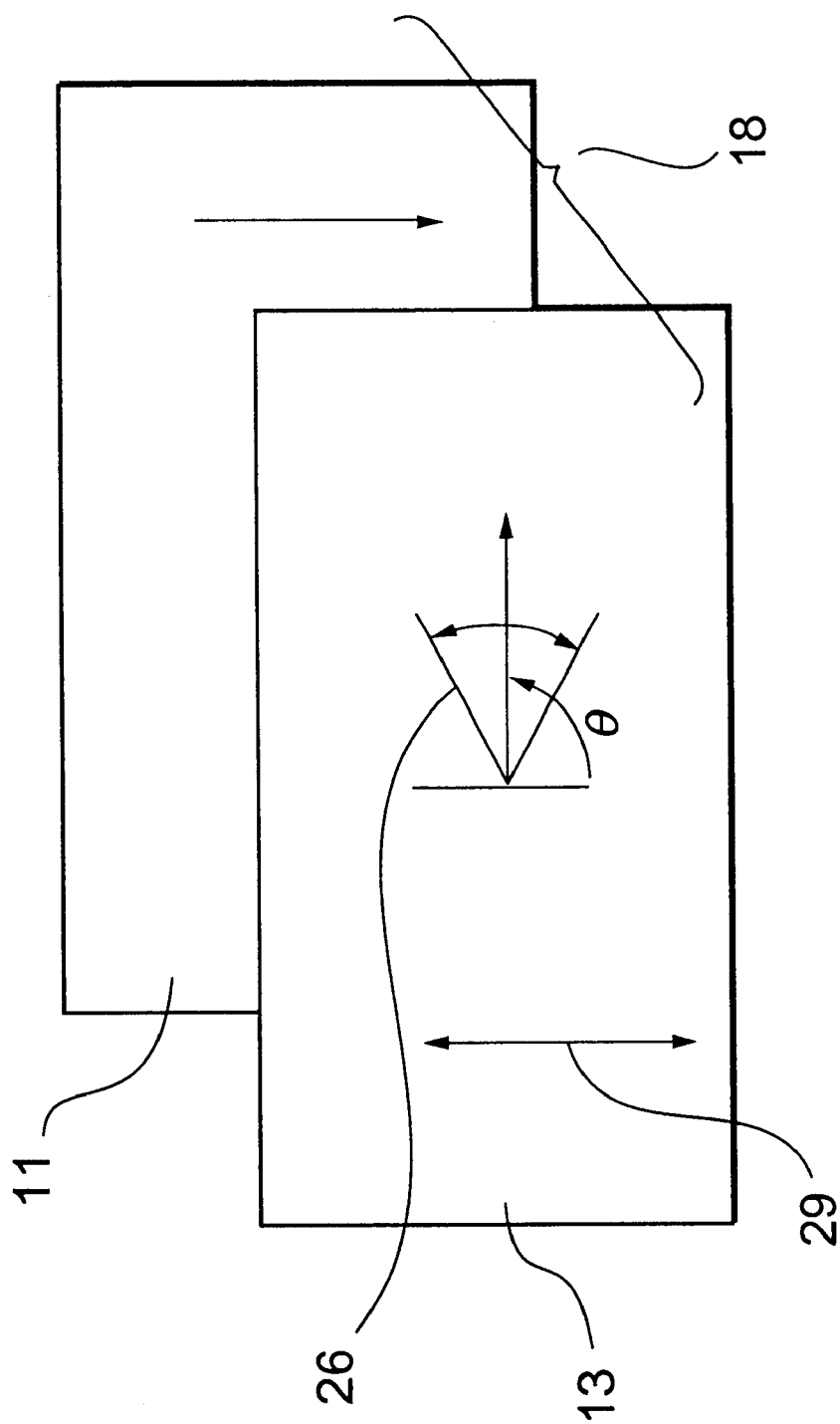
FIG. 6 is a conceptual diagram showing the structure of the giant magnetoresistive sensing element in accordance with the present invention.

The magnetic easy axis 29 of the magnetic free layer 13 according to this embodiment (the intensity of the uni-axial anisotropy magnetic field is Hk) is characterized by being directed to the direction of the signal magnetic field 5 as shown in FIG. 6. In other words, the magnetic easy direction, that is, the magnetic easy axis 29 is identical with the direction of the signal magnetic field 5.

In general, when the signal magnetic field is applied in the direction of the magnetic easy axis, its magnetization stabilization direction can be calculated by using a coherent magnetization rotation model. When the magnetic stabilization direction (angle θ) is determined, in the giant magnetoresistive sensing element, its resistance change δR is represented by the following expression.

$$\delta R = -(\tfrac{1}{2})\Delta R \cdot \cos\theta$$

Figure 7:
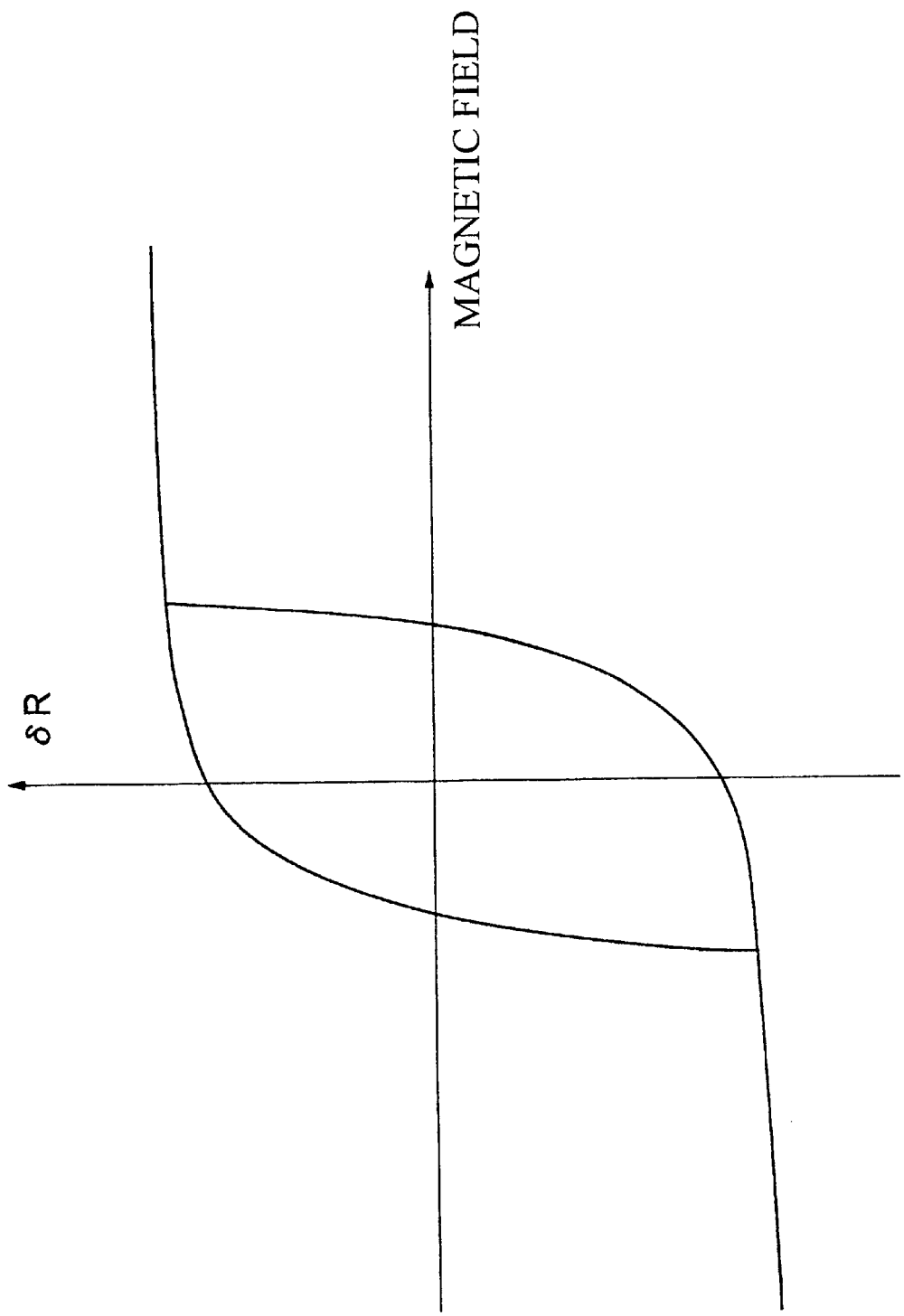
FIG. 7 is a graph showing a response of a resistance change δR to a magnetic field in a signal magnetic field direction in accordance with the conventional example.

A general response of the δR to the applied magnetic field Hy in the direction of the signal magnetic field exhibits a large hysteresis as shown in FIG. 7.

The hysteresis gives rise to a problem in a practical use because when the spin valve element is used as a magnetic head, a base line shift occurs in a read signal waveform, which induces the occurrence of a Barkhausen effect.

Figure 1:
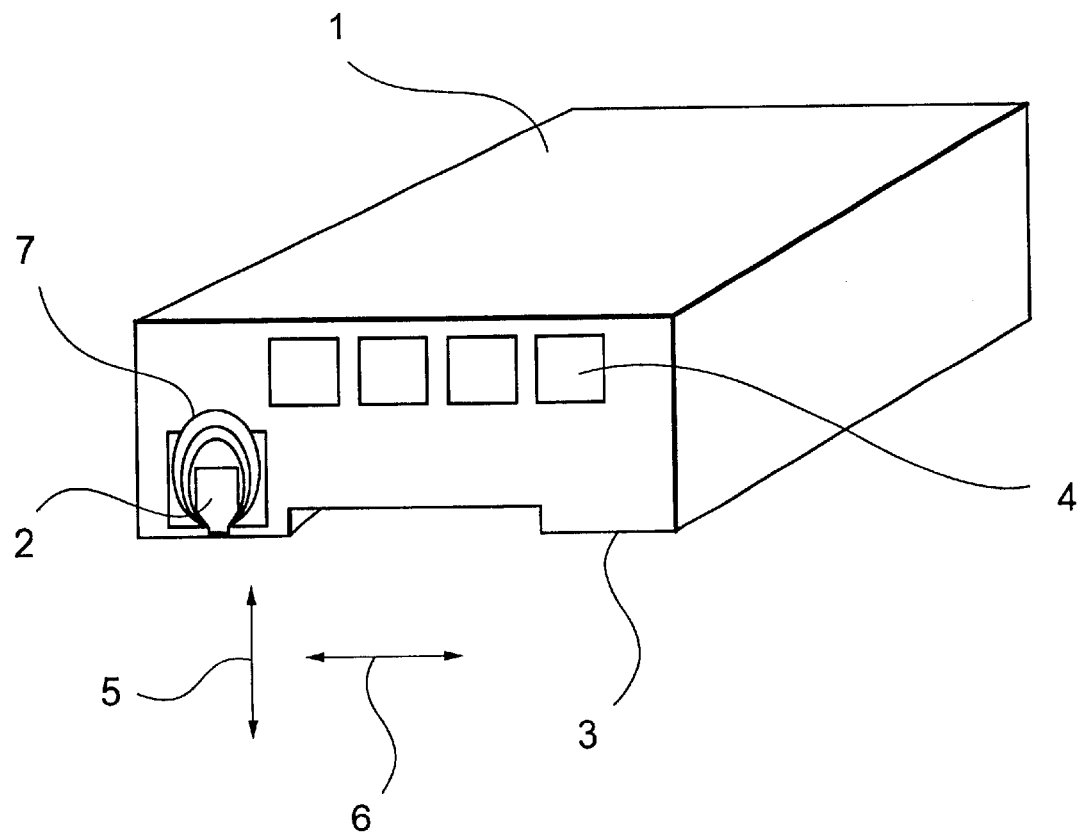
FIG. 1 is a perspective view showing the structure common to magnetic heads of a conventional example and the present invention.
Figure 2:
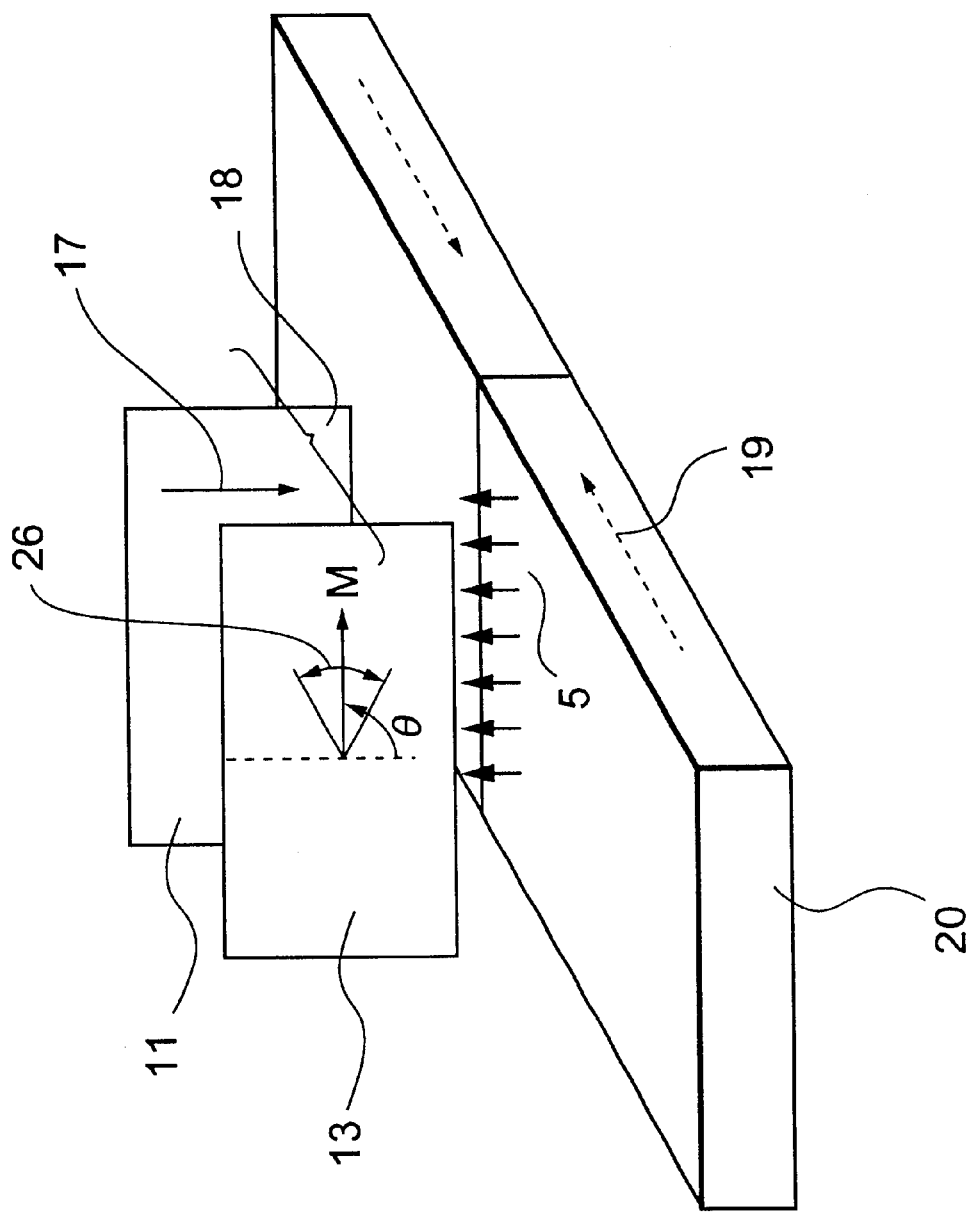
FIG. 2 is a diagram showing the structure common to giant magnetoresistive sensing elements of the conventional example and the present invention.
Figure 3:
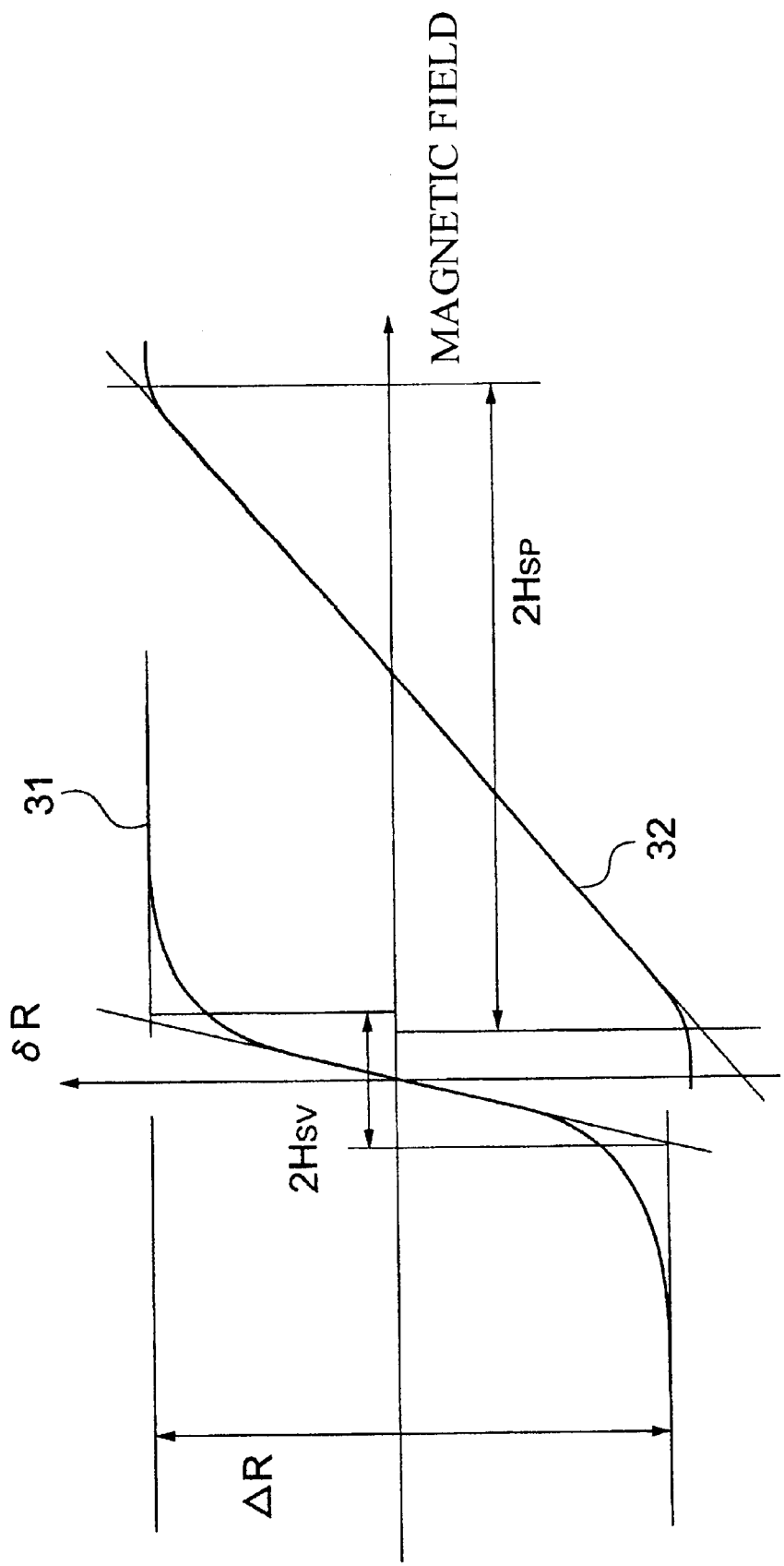
FIG. 3 is a graph showing a response of a resistance change δR to a magnetic field in a track widthwise direction and a response of the resistance change R to a magnetic field in a signal magnetic field direction in accordance with the present invention.
Figure 5:
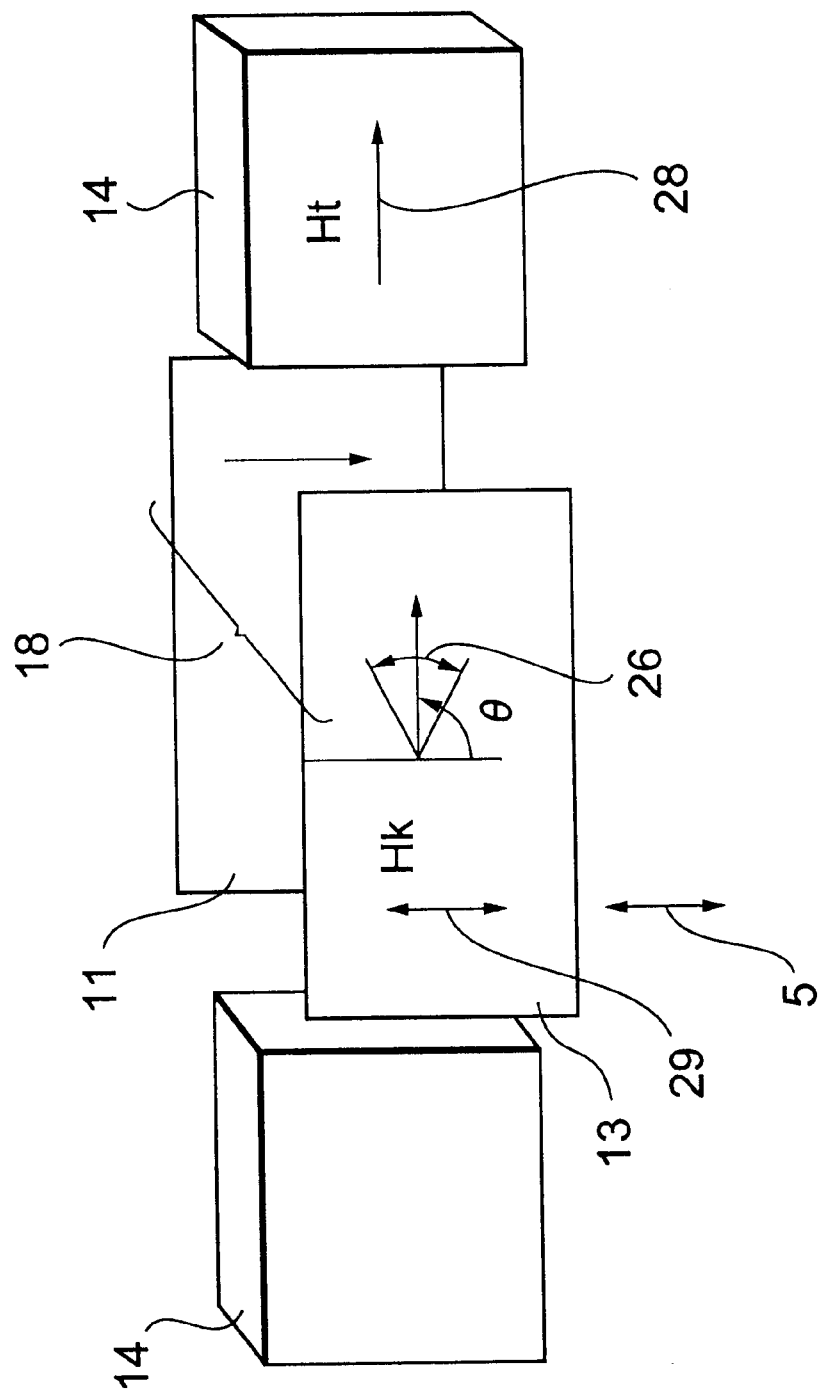
FIG. 5 is a conceptual diagram showing the structure of the giant magnetoresistive sensing element in accordance with the present invention.

In the embodiment of the present invention, in addition, a permanent magnet film is located on both sides of the spin valve element as shown in FIG. 5, and the longitudinal bias magnetic field Ht is applied. If the intensity of Ht is selected to an appropriate value in advance, no hysteresis appears in the signal magnetic field response 31 of the resistance change δR of the spin valve element as shown in FIG. 3. Since the signal magnetic field response 31 of δR is based on the inversion of the magnetization in the direction of the magnetic easy axis, the sensitivity to the magnetic field is fundamentally high. The response of δR to the magnetic field in the direction perpendicular to the signal magnetic field is characterized in that the sensitivity to the magnetic field is lower than the response to the magnetic field in the direction of the signal magnetic field, as indicated by a track width direction magnetic field response 32 shown in FIG. 3.

Figure 8:
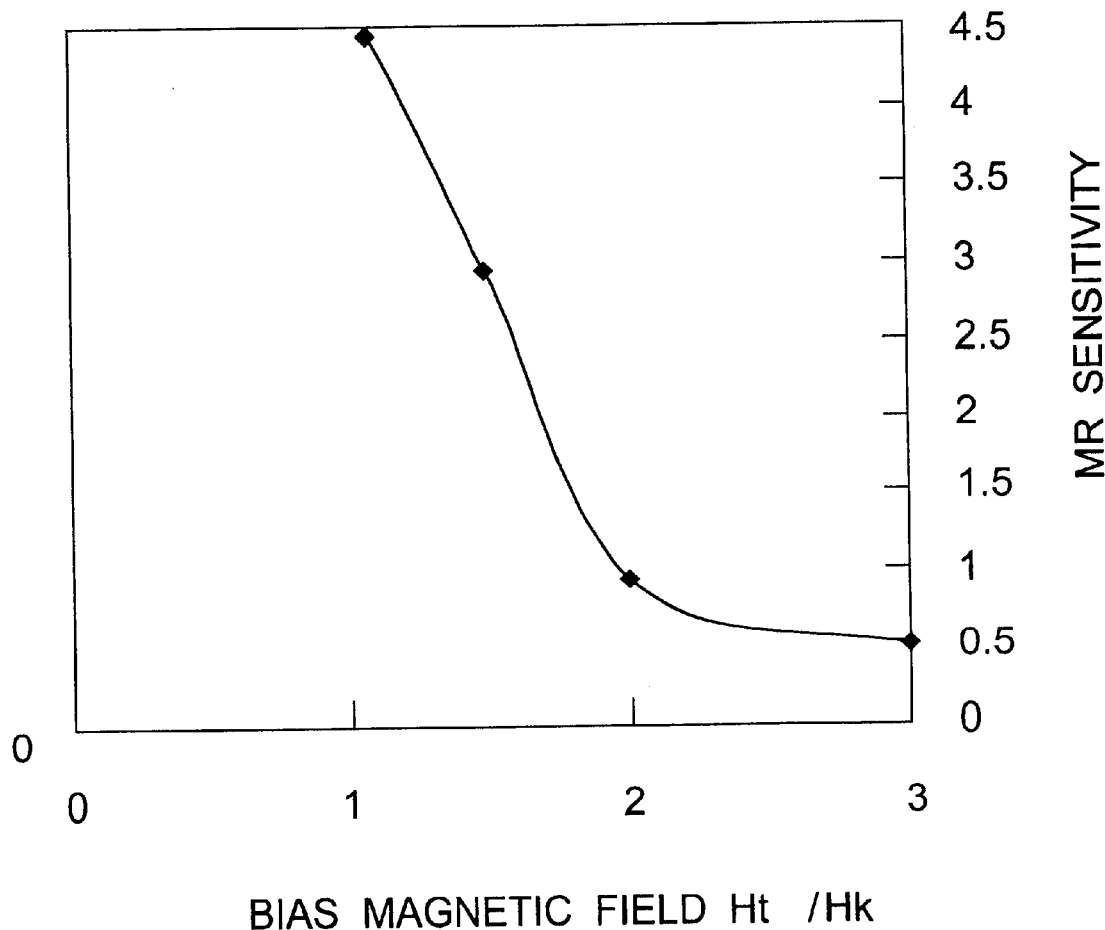
FIG. 8 is a graph showing a relation between a longitudinal bias magnetic field Ht and a response sensitivity of a resistance change δR to a magnetic field in a signal magnetic field direction in accordance with the present invention.
Figure 9:
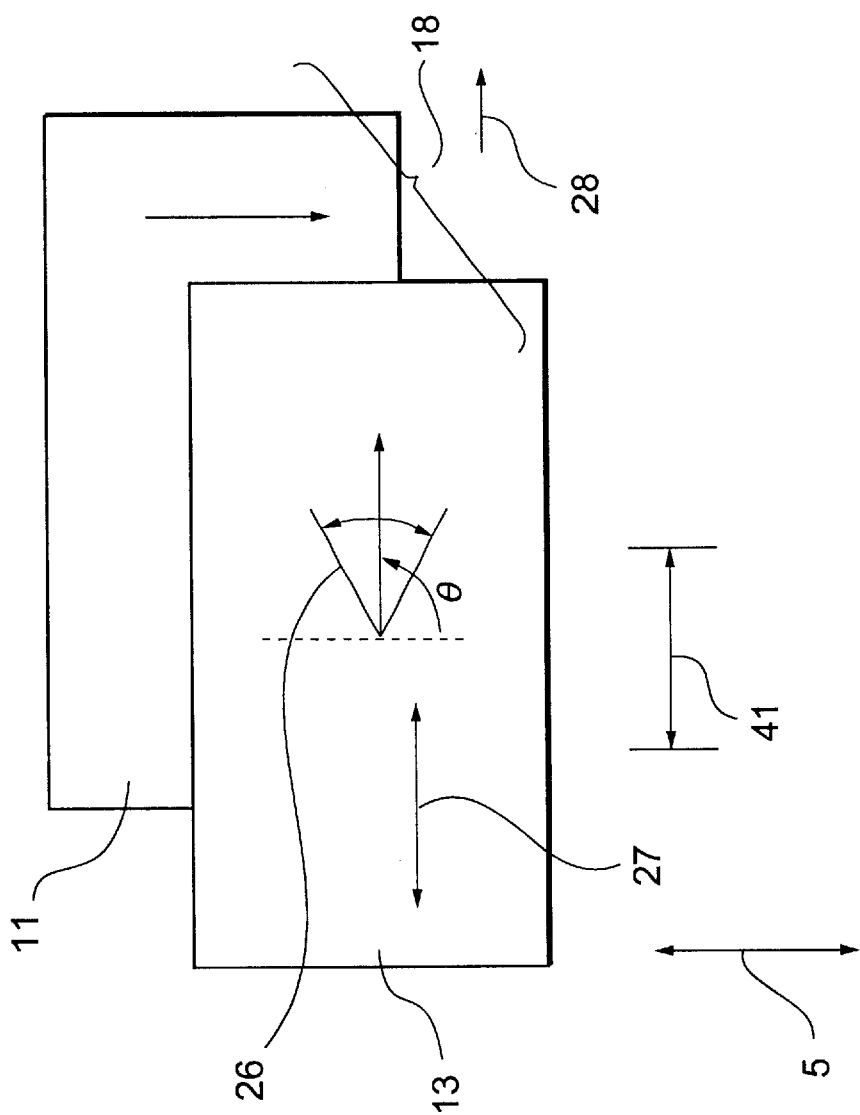
FIG. 9 is a conceptual diagram showing the structure of a giant magnetoresistive sensing element in accordance with the conventional example.
Figure 10:
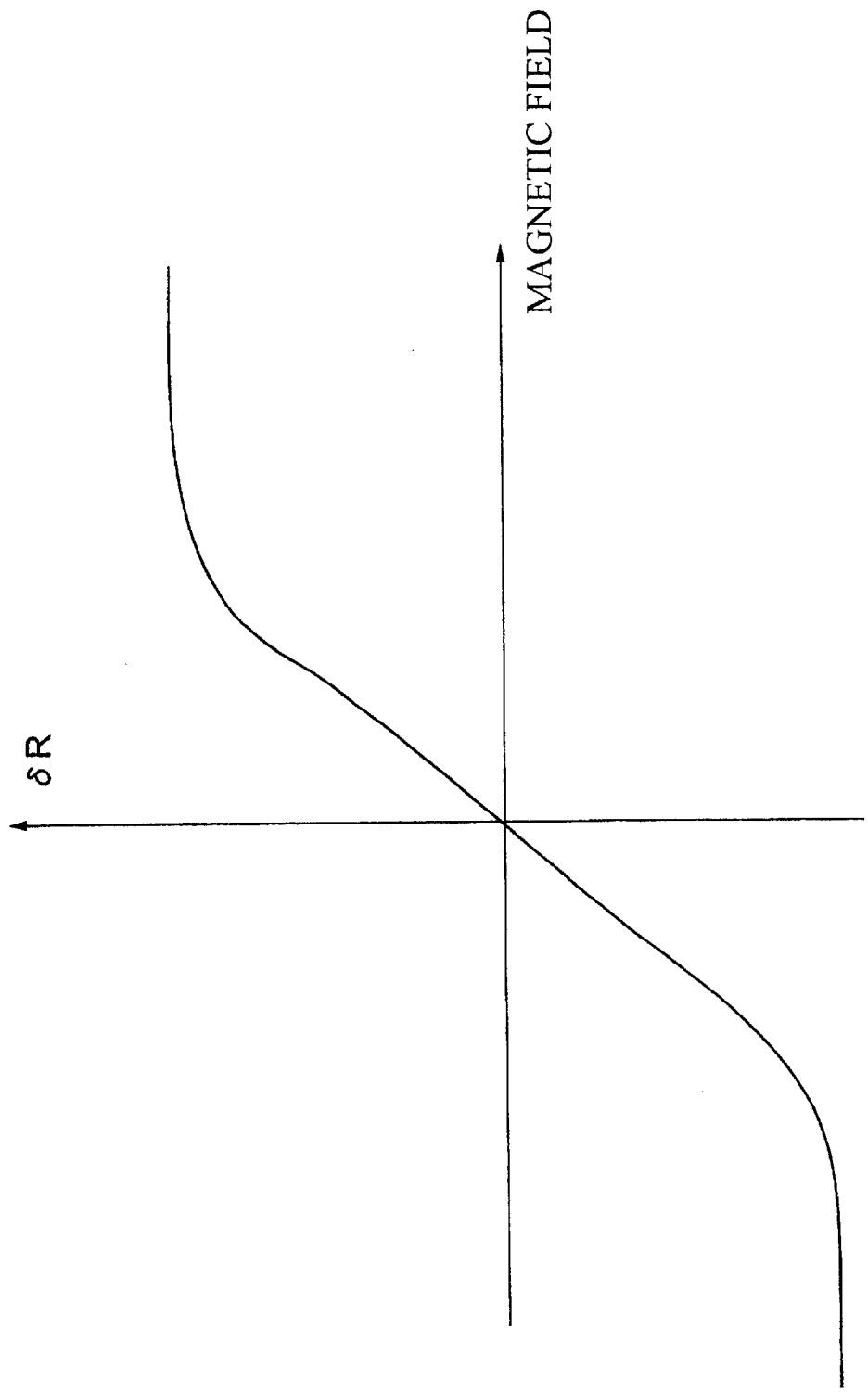
FIG. 10 is a graph showing a response of a resistance change δR to a magnetic field in a signal magnetic field direction in accordance with the conventional example (in case of no hysteresis)
Figure 11:
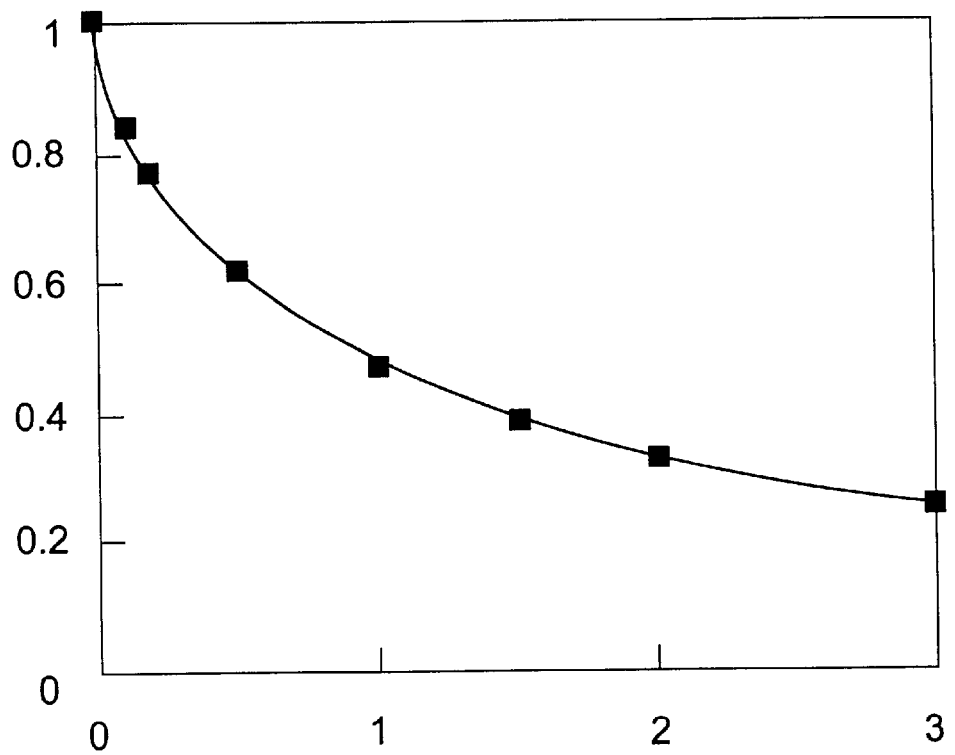
FIG. 11 is a graph showing a relation between a longitudinal bias magnetic field Ht and a response sensitivity of a resistance change δR to a magnetic field in a signal magnetic field direction in accordance with the conventional example.

The response sensitivity $\Delta R/(2 \cdot Hsv)$ of δR to the magnetic field in the signal magnetic field direction, that is, the MR sensitivity greatly varies as the longitudinal bias magnetic field Ht is changed as shown in FIG. 8, according to a simulation result using the coherent magnetization rotation model, where Hsv denotes a saturation field strength as shown in FIG. 3. In case of Ht<Hk, a hysteresis occurs in the magnetic field response of δR. In case of Ht≧Hk (the hysteresis disappears), if Ht further increases, the MR sensitivity is deteriorated. When Ht>2 Hk becomes satisfied, the ratio of deterioration of the MR sensitivity is reduced which is caused by an increase of Ht.

However, even if Ht>2 Hk is satisfied, the MR sensitivity is greatly higher than the MR sensitivity of the conventional spin valve element.

The present invention is characterized in that as shown in FIG. 3, the sensitivity of the response of δR to the magnetic field in the signal direction, that is, the ratio ($\Delta R/(2 \cdot Hsv)$) of ΔR and the magnetic field intensity $2 \cdot Hsv$ required for the maximum resistance change of ΔR is larger than the sensitivity of the response of δR to the magnetic field in the track widthwise direction, that is, the ratio ($\Delta R/(2 \cdot Hsp)$) of the maximum resistance change ΔR and the magnetic field intensity $2 \cdot Hsp$ required for the resistance change of ΔR.

In addition, the present invention is characterized in that the direction of the uni-axial anisotropy (intensity Hk) of the magnetic free layer of the giant magnetoresistive sensing element is in parallel to the signal magnetic field direction, and the generated magnetic field (Ht) of the longitudinal bias magnet film located on both sides of the giant magnetoresistive sensing element satisfies Ht≧Hk. Moreover, if Ht>2 Hk is satisfied, the structure of the present invention is more preferable.

The advantage of the present invention resides in that the MR sensitivity is higher than that in the arrangement of the magnetic easy axis which is in parallel to the track width direction of the conventional magnetic free layer 13 as shown in FIG. 8. In particular, when the longitudinal bias magnetic field Ht is between Hk and 2 Hk, the MR sensitivity is larger than 1. MR sensitivity=1 means a case in which the resistance change δR obtained when the signal magnetic field intensity Hy which is equal to Hk is applied is equal to the maximum resistance change ΔR.

It is needless to further say that no hysteresis occurs in the signal magnetic field response of δR.

As described above, the advantage of the present invention resides in that the MR sensitivity is higher than that in the arrangement of the magnetic easy axis which is in parallel to the track width direction of the conventional magnetic free layer 13 with the results that a large read output can be obtained even in the case where the high-density recording is further advanced, and the S/N ratio can also be improved. This is because the direction of the magnetization easy axis is in parallel to the direction of the signal magnetic field.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A giant magnetoresistive sensing element for detecting a magnetic field from a magnetic disk to read a signal, comprising:

a magnetic fixed layer magnetized in parallel to a magnetic field direction of a signal from said magnetic disk (hereinafter referred to as "signal magnetic field direction");

an electrically conductive layer to which a current is supplied from an exterior, for detecting a resistance change which is used for reading a signal;

a magnetic free layer which a magnetic easy axis thereof is in parallel to the signal magnetic field direction; and a longitudinal bias layer located on both sides of the magnetic free layer, wherein a longitudinal bias magnetic field is applied to the magnetic free layer in a direction perpendicular to the signal magnetic field direction to reorientate a direction of magnetization of the magnetic free layer.

2. A giant magnetoresistive sensing element as claimed in claim 1, wherein the intensity of the longitudinal bias magnetic field is larger than the intensity of a uni-axial anisotropy magnetic field of said magnetic free layer and smaller than twice that of the intensity of the uni-axial anisotropy magnetic field.

3. A magnetic head for reading and writing information, comprising:

a giant magnetoresistive sensing element as claimed in claim 1.

4. A magnetic disk device, comprising:

a magnetic head as claimed in claim 3.

5. A giant magnetoresistive sensing element as claimed in claim 1, wherein the intensity of the longitudinal bias magnetic field is larger than the intensity of a uni-axial anisotropy magnetic field of said magnetic free layer.

6. A magnetic head for reading and writing information, comprising:

a giant magnetoresistive sensing element as claimed in claim 5.

7. A magnetic disk device, comprising:

a magnetic head as claimed in claim 6.

8. A giant magnetoresistive sensing element as claimed in claim 1, wherein the magnetic free layer vibratingly rotates the direction of magnetization thereof due to a signal magnetic field from said magnetic disk; and the MR sensitivity in the signal magnetic field direction is higher than the MR sensitivity to a direction perpendicular to the signal magnetic field direction.

9. A giant magnetoresistive sensing element as claimed in claim 8, wherein the intensity of the longitudinal bias magnetic field is larger than the intensity of a uni-axial anisotropy magnetic field of said magnetic free layer and smaller than twice that of the intensity of the uni-axial anisotropy magnetic field.

10. A magnetic head for reading and writing information, comprising:

a giant magnetoresistive sensing element as claimed in claim 8.

11. A magnetic disk device, comprising:

a magnetic head as claimed in claim 10.

12. A giant magnetoresistive sensing element as claimed in claim 8, wherein the intensity of the longitudinal bias magnetic field is larger than the intensity of a uni-axial anisotropy magnetic field of said magnetic free layer.

13. A magnetic head for reading and writing information, comprising:

a giant magnetoresistive sensing element as claimed in claim 12.

14. A magnetic disk device, comprising:

a magnetic head as claimed in claim 13.

* * * * *